US008100791B2

(12) United States Patent
Yamaguchi et al.

(10) Patent No.: US 8,100,791 B2
(45) Date of Patent: Jan. 24, 2012

(54) CONTINUOUSLY VARIABLE TRANSMISSION

(75) Inventors: Kenichi Yamaguchi, Chiryu (JP); Hiroki Kondo, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 298 days.

(21) Appl. No.: 12/475,756

(22) Filed: Jun. 1, 2009

(65) Prior Publication Data

US 2009/0298626 A1    Dec. 3, 2009

(30) Foreign Application Priority Data

May 30, 2008  (JP) ................. 2008-142986

(51) Int. Cl.
  *F16H 59/00*  (2006.01)
  *F16H 61/00*  (2006.01)
  *F16H 63/00*  (2006.01)
  *F16H 55/56*  (2006.01)

(52) U.S. Cl. .................. 474/28; 474/18; 474/13; 474/8; 184/7.2; 184/7.3

(58) Field of Classification Search ................ 474/8, 13, 474/18, 28; 184/7.2, 7.3
See application file for complete search history.

(56) References Cited

U.S. PATENT DOCUMENTS

| | | | | |
|---|---|---|---|---|
| 3,052,132 A | * | 9/1962 | Karig et al. ................ 474/18 |
| 3,596,528 A | * | 8/1971 | Dittrich et al. ................ 474/12 |
| 3,704,634 A | * | 12/1972 | Schrodt ................ 474/18 |
| 4,143,558 A | * | 3/1979 | Van Deursen et al. .......... 474/28 |
| 4,261,213 A | * | 4/1981 | Rattunde ................ 476/9 |
| 4,350,491 A | * | 9/1982 | Steuer ................ 474/12 |
| 4,433,594 A | * | 2/1984 | Smirl ................ 475/206 |
| 4,464,145 A | * | 8/1984 | Kawamoto et al. ............ 474/28 |
| 4,469,333 A | * | 9/1984 | Schlicker ................ 277/585 |
| 4,534,243 A | * | 8/1985 | Yokoyama et al. ............ 477/49 |
| 4,552,545 A | * | 11/1985 | Koivunen ................ 474/16 |
| 4,575,364 A | * | 3/1986 | Lamers ................ 474/16 |
| 4,627,313 A | * | 12/1986 | Sakai ................ 474/18 |
| 4,722,718 A | * | 2/1988 | Eugen ................ 474/19 |
| 4,753,627 A | * | 6/1988 | Kawamoto ................ 474/18 |
| 4,942,786 A | * | 7/1990 | Dittrich ................ 477/46 |
| 5,180,339 A | * | 1/1993 | Haley et al. ................ 474/28 |
| 5,182,968 A | * | 2/1993 | Mott ................ 474/11 |
| 5,184,981 A | * | 2/1993 | Wittke ................ 474/19 |
| 5,221,235 A | * | 6/1993 | Ogawa ................ 474/25 |
| 5,439,419 A | * | 8/1995 | Yamada et al. ................ 474/18 |
| 5,607,371 A | * | 3/1997 | Yamaguchi ................ 475/210 |
| 5,628,700 A | * | 5/1997 | Yamada et al. ................ 474/18 |

(Continued)

FOREIGN PATENT DOCUMENTS

JP    08042654 A    2/1996

(Continued)

*Primary Examiner* — Michael Mansen
*Assistant Examiner* — Henry Liu
(74) *Attorney, Agent, or Firm* — Gifford, Krass, Sprinkle, Anderson & Citkowski, P.C.

(57) ABSTRACT

A continuously variable transmission in which a sliding member is prevented from inclining is provided. The continuously variable transmission has a first oil passage provided in a movable sheave, and a second oil passage provided in a primary shaft supporting the movable sheave and connected in series to the first oil passage. A working oil is discharged from a hydraulic chamber via the first and second oil passages. The working oil is more difficult to discharge from the second oil passage than the first oil passage.

6 Claims, 3 Drawing Sheets

U.S. PATENT DOCUMENTS

| | | | |
|---|---|---|---|
| 5,711,730 A * | 1/1998 | Friedman et al. | 474/18 |
| 5,776,022 A * | 7/1998 | Schellekens | 474/18 |
| 5,803,846 A * | 9/1998 | Yamada et al. | 474/18 |
| 5,879,253 A * | 3/1999 | Friedmann et al. | 474/18 |
| 5,941,787 A * | 8/1999 | Imaida et al. | 474/18 |
| 6,015,359 A * | 1/2000 | Kunii | 474/18 |
| 6,089,999 A * | 7/2000 | Imaida et al. | 474/18 |
| 6,152,843 A * | 11/2000 | Murakami | 474/28 |
| 6,174,253 B1 * | 1/2001 | Walter et al. | 474/18 |
| 6,190,274 B1 * | 2/2001 | Walter | 474/28 |
| 6,234,925 B1 * | 5/2001 | Walter | 474/18 |
| 6,241,635 B1 * | 6/2001 | Schmid et al. | 474/11 |
| 6,280,357 B1 * | 8/2001 | Van Spijk | 474/16 |
| 6,336,878 B1 * | 1/2002 | Ehrlich et al. | 474/28 |
| 6,342,024 B1 * | 1/2002 | Walter et al. | 475/210 |
| 6,361,470 B1 * | 3/2002 | Friedmann et al. | 477/37 |
| 6,491,596 B1 * | 12/2002 | Heinrich et al. | 474/8 |
| 6,669,588 B2 * | 12/2003 | Schmid | 474/18 |
| 6,997,834 B2 * | 2/2006 | Vorndran et al. | 474/28 |
| 7,014,583 B2 * | 3/2006 | Diosi et al. | 474/12 |
| 7,048,657 B2 * | 5/2006 | Faust et al. | 474/18 |
| 7,686,715 B2 * | 3/2010 | Carlson et al. | 474/28 |
| 7,753,814 B2 * | 7/2010 | Nozawa et al. | 474/28 |
| 7,771,301 B2 * | 8/2010 | Kauffeldt | 474/28 |
| 2001/0031678 A1 * | 10/2001 | Schmid et al. | 474/18 |
| 2002/0142870 A1 * | 10/2002 | Okano et al. | 474/28 |
| 2003/0013566 A1 * | 1/2003 | Vorndran et al. | 474/18 |
| 2003/0216200 A1 * | 11/2003 | List | 474/28 |
| 2005/0209031 A1 * | 9/2005 | Walter et al. | 474/18 |
| 2005/0233844 A1 * | 10/2005 | Kuroda | 474/28 |
| 2006/0009321 A1 * | 1/2006 | Carlson et al. | 474/18 |
| 2006/0058127 A1 * | 3/2006 | Walter et al. | 474/8 |
| 2006/0058130 A1 * | 3/2006 | Vornehm et al. | 474/28 |
| 2006/0154762 A1 * | 7/2006 | Brown | 474/28 |
| 2006/0258493 A1 * | 11/2006 | Kauffeldt | 474/28 |
| 2007/0249440 A1 * | 10/2007 | Nozawa et al. | 474/28 |
| 2008/0064564 A1 * | 3/2008 | Faust | 477/45 |
| 2009/0062044 A1 * | 3/2009 | Shioiri et al. | 474/13 |
| 2009/0291788 A1 * | 11/2009 | Hokari et al. | 474/28 |

FOREIGN PATENT DOCUMENTS

| | | |
|---|---|---|
| JP | 2006064008 | 3/2006 |
| JP | 2006300270 | 11/2006 |
| JP | 2007192375 | 8/2007 |

* cited by examiner

CONTINUOUSLY VARIABLE TRANSMISSION

INCORPORATION BY REFERENCE

The disclosure of Japanese Patent Application No. 2008-142986 filed on May 30, 2008 including the specification, drawings and abstract is incorporated herein by reference in its entirety.

BACKGROUND OF THE INVENTION

1. Field of the Invention

The invention relates to a continuously variable transmission, and more specifically to a continuously variable transmission in which speed change is performed by changing the width of a variable speed pulley.

2. Description of the Related Art

A continuously variable transmission is disclosed, for example, in Japanese Patent Application Publication No. 2006-64008 (JP-A-2006-64008), Japanese Patent Application Publication No. 2006-300270 (JP-A-2006-300270), and Japanese Patent Application Publication No. 2007-192375 (JP-A-2007-192375).

JP-A-2006-64008 discloses an example of a belt-type continuously variable transmission structure. JP-A-2006-300270 discloses a valve that inhibits the discharge of a working oil. JP-A-2007-192375 also discloses a valve that inhibits the discharge of a working oil. However, the problem associated with the configurations disclosed in JP-A-2006-64008, JP-A-2006-300270, and JP-A-2007-192375 is that a sliding member inclines and stable rotation is difficult to ensure when the pressure inside a hydraulic chamber is decreased.

SUMMARY OF THE INVENTION

The invention provides a continuously variable transmission in which a sliding member can be maintained in an optimum position.

The continuously variable transmission according to the first aspect of the invention includes a first oil passage provided in a sliding member and a second oil passage provided in a shaft supporting the sliding member and connected in series to the first oil passage. A working oil is discharged from a hydraulic chamber via the first and second oil passages. The working oil is more difficult to discharge from the second oil passage than from the first oil passage.

In the continuously variable transmission of such a configuration, because the working oil is more difficult to discharge from the second oil passage than from the first oil passage, an oil pressure is supplied between the sliding member and shaft even in a case where the pressure inside the hydraulic chamber is reduced. As a result, the sliding member can be prevented from inclining.

The continuously variable transmission according to the second aspect of the invention includes a first oil passage provided in a sliding member, and a second oil passage and a third oil passage that are provided in a shaft supporting the sliding member. Part of a working oil discharged from the first oil passage is discharged from the second oil passage and the remainder is discharged from the third oil passage. The working oil is more difficult to discharge from the second oil passage provided on the side close to a belt for power transmission than from the third oil passage provided on the side far from the belt for power transmission.

In this case, the working oil moves from the side close to the belt for power transmission to the side that is far therefrom, and the sliding member can be prevented more effectively from inclining.

BRIEF DESCRIPTION OF THE DRAWINGS

The foregoing and further features and advantages of the invention will become more apparent from the following description of example embodiments with reference to the accompanying drawings, wherein like numerals are used to represent like elements and wherein.

DETAILED DESCRIPTION OF EMBODIMENTS

Figure 1:
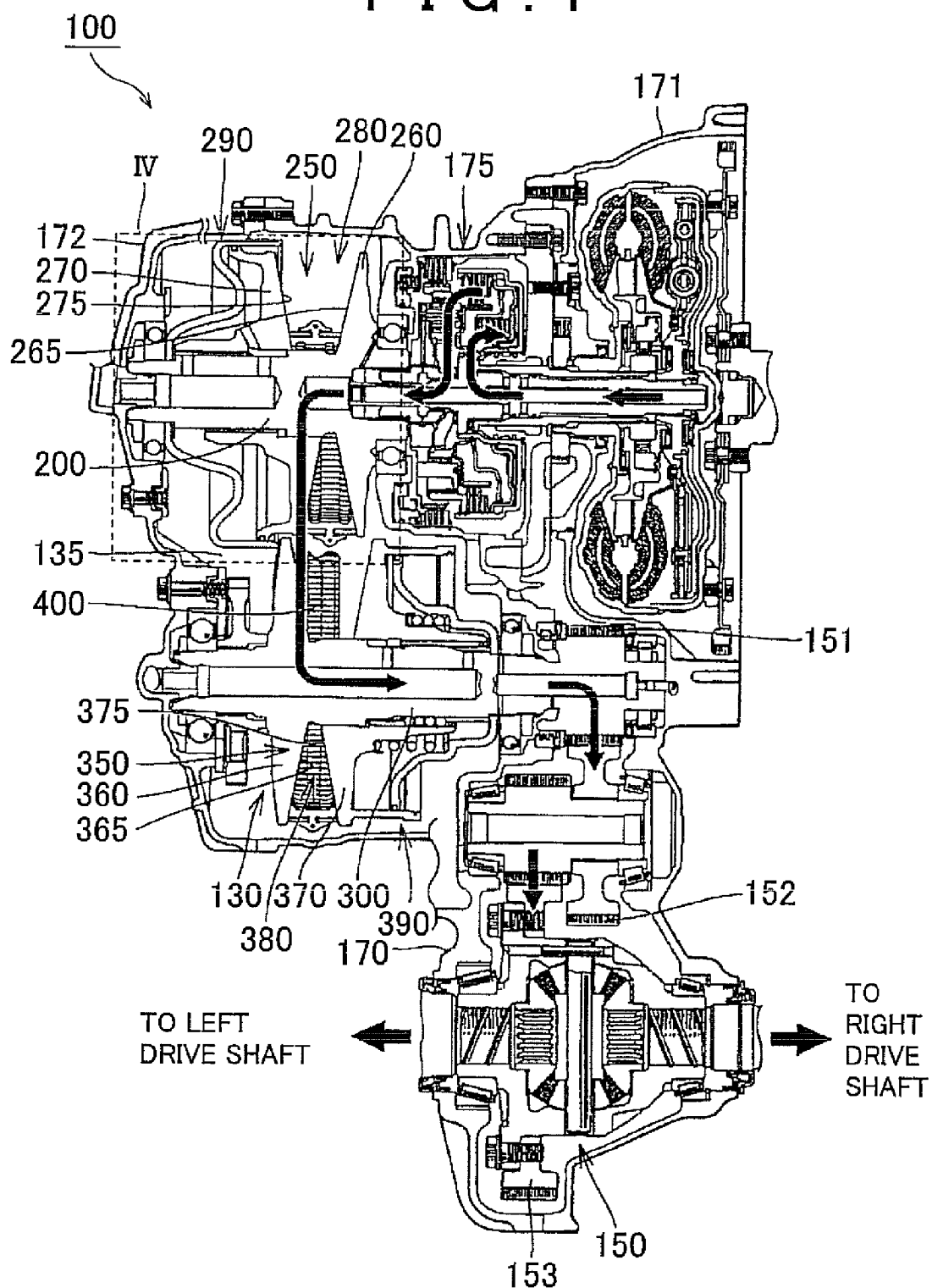
FIG. 1 is a cross-sectional schematic diagram illustrating the configuration of the continuously variable transmission according to Embodiment 1 of the invention.

Embodiments of the invention will be described below with reference to the appended drawings. In the below-described embodiments, identical or corresponding components will be assigned with identical reference numerals and explanation thereof will not be repeated.

FIG. 1 is a cross-sectional schematic diagram illustrating the configuration of a continuously variable transmission according to Embodiment 1 of the invention. A belt-type continuously variable transmission 100 shown in FIG. 1 is installed on a vehicle such as an automobile. The continuously variable transmission 100 is provided with a transmission mechanism unit 130.

The transmission mechanism unit 130 includes a primary shaft 200 on a drive side (input side) that inputs a torque from an engine, a secondary shaft 300 on a driven side (output side) that outputs the torque, a primary pulley 250 that is provided at the primary shaft 200, and a secondary pulley 350 that is provided at the secondary shaft 300. The primary shaft 200 and secondary shaft 300 are disposed parallel each other with a certain spacing therebetween.

The continuously variable transmission 100 includes a differential unit 150. The differential unit 150 is provided so that power can be transmitted thereto from the transmission mechanism unit 130. The differential unit 150 includes a ring gear 153, and the ring gear 153 is linked to the secondary shaft 300 via gears 151 and 152. The differential unit 150 that received power transmission from the transmission mechanism unit 130 transmits a uniform drive force to both wheels, while changing a rotation speed of the left and right wheels when the vehicle makes a turn.

The continuously variable transmission 100 includes a case body 175. The case body 175 accommodates the transmission mechanism unit 130 and differential unit 150 and forms an outer shape of the continuously variable transmission 100. The case body 175 includes a transaxle housing 171, a transaxle case 170, and a transaxle rear cover 172. The transaxle housing 171 is disposed on the engine side with respect to the transaxle case 170, and the transaxle rear cover 172 is disposed on the opposite side.

The case body 175 forms a transmission mechanism chamber 135. The transmission mechanism unit 130 is accommodated in the transmission mechanism chamber 135. The transmission mechanism chamber 135 is formed by the transaxle case 170 and transaxle rear cover 172.

The primary pulley 250 is an input-side transmission pulley that is provided at the primary shaft 200, which is a rotary shaft on the input side of the continuously variable transmission 100. The primary pulley 250 rotates together with the primary shaft 200 about the central axis of the primary shaft 200 that is a virtual axis. The primary pulley 250 is provided with a fixed sheave 260 as a first fixed sheave, a movable sheave 270 as a first movable sheave, and a hydraulic actuator 290 as a first hydraulic drive unit that drives the movable sheave 270.

The fixed sheave 260 is fixed to the primary shaft 200, and the fixing is such that the fixed sheave does not move in the circumferential direction or axial direction with respect to the primary shaft 200. The fixed sheave 260 extends radially and outwardly of the outer circumferential surface of the primary shaft 200 and is formed in a disk-like shape.

The movable sheave 270 is provided at the primary shaft 200 at a certain distance from the fixed sheave 260 in the direction of virtual central axis of the primary shaft 200. The movable sheave 270 is so provided that it can move in the axial direction with respect to the primary shaft 200. The movable sheave 270 rotates together with the primary shaft 200 and cannot move in the circumferential direction with respect to the primary shaft 200.

A pulley groove 280 into which a metal belt 400 is inserted is established by the power transmission surface 265 of the fixed sheave 260 and the power transmission surface 275 of the movable sheave 270.

The secondary pulley 350 is an output-side transmission pulley that is provided at the secondary shaft 300 that is a rotary shaft on the output side of the continuously variable transmission 100. The secondary pulley 350 rotates together with the secondary shaft 300 about a central axis of the secondary shaft 300 that is a virtual axis. The secondary pulley 350 is provided with a fixed sheave 360 as a second fixed sheave, a movable sheave 370 as a second movable sheave, and a hydraulic actuator 390 as a second hydraulic drive unit that can drive the movable sheave 370 back and forth with respect to the fixed sheave 360.

The fixed sheave 360 is formed integrally with the secondary shaft 300 and fixed so that the fixed sheave does not move in the circumferential direction or axial direction with respect to the secondary shaft 300. The fixed shaft 360 extends radially and outwardly of the outer circumferential surface of the secondary shaft 300 and is formed in a disk-like shape.

Of the surface of the fixed sheave 360, a portion that faces the movable sheave 370 serves as a power transmission surface 365 that is in contact with the metal belt 400. The power transmission surface 365 is inclined so as to withdraw from the movable sheave 370 as the radial distance from the secondary shaft 300 increases.

The movable sheave 370 is provided at the secondary shaft 300 at a certain distance from the fixed sheave 360 in the direction of virtual central axis of the secondary shaft 300. The movable sheave 370 is so provided that it can move in the axial direction with respect to the secondary shaft 300. The movable sheave 370 rotates together with the secondary shaft 300 and cannot move in the circumferential direction with respect to the secondary shaft 300.

The movable sheave 370 is provided with a cylindrical tubular portion having the secondary shaft 300 inserted thereinto and a disk-shaped collar that is connected to an end of the tubular portion on the side of the fixed sheave 360. The collar of the movable sheave 370 is formed in a toroidal shape.

The tubular portion of the movable sheave 370 is formed in a cylindrical shape and extends in the central axis direction of the secondary shaft 300. The movable sheave 370 is provided so that it can move in the central axis direction of the secondary shaft 300, but cannot rotate in the circumferential direction of the secondary shaft 300.

Of the surface of the collar of the movable sheave 370, a portion that faces the fixed sheave 360 serves as a power transmission surface 375 that is in contact with the metal belt 400. The power transmission surface 375 is inclined so as to withdraw from the fixed sheave 360 as the radial distance from the secondary shaft 300 increases.

A pulley groove 380 into which a metal belt 400 is inserted is established by the power transmission surface 365 of the fixed sheave 360 and the power transmission surface 375 of the movable sheave 370.

The metal belt 400 used in the continuously variable transmission 100 is wound about the primary pulley 250 attached to the primary shaft 200 and the secondary pulley 350 attached to the secondary shaft 300. The metal belt 400 is constituted, for example, by a flexible band-like steel ring and a plurality of elements arranged in a row in the longitudinal direction of the steel ring and mated with the steel ring.

The metal belt 400 functions as a power transmission member that is in a frictional contact with the power transmission surfaces 265 and 275, which are inner circumferential surfaces of the primary pulley 250 and are opposing surfaces of the pulley groove 280, and the power transmission surfaces 365 and 375, which are inner circumferential surfaces of the secondary pulley 350 and are opposing surfaces of the pulley groove 380. As a result, the metal belt 400 transmits power between the primary pulley 250 and secondary pulley 350.

Where the hydraulic actuators 290 and 390 are controlled correspondingly to the travel state of the vehicle, and the groove width of pulley grooves 280 and 380, which can be changed in a continuously variable manner, is changed, the winding radius of the metal belt 400 on the primary pulley 250 and secondary pulley 350 changes. As a result, the transmission mechanism unit 130 varies a ratio of the rotation rate of the primary shaft 200 and the rotation rate of the secondary shaft 300, that is, a transmission ratio in a continuously variable (continuous) manner.

Figure 2:
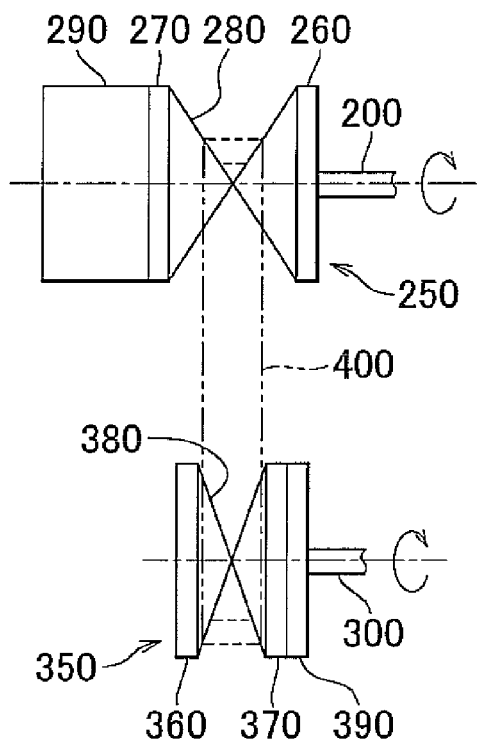
FIG. 2 is a schematic diagram that shows a state with a maximum speed reduction ratio of the continuously variable transmission shown in FIG. 1.
Figure 3:
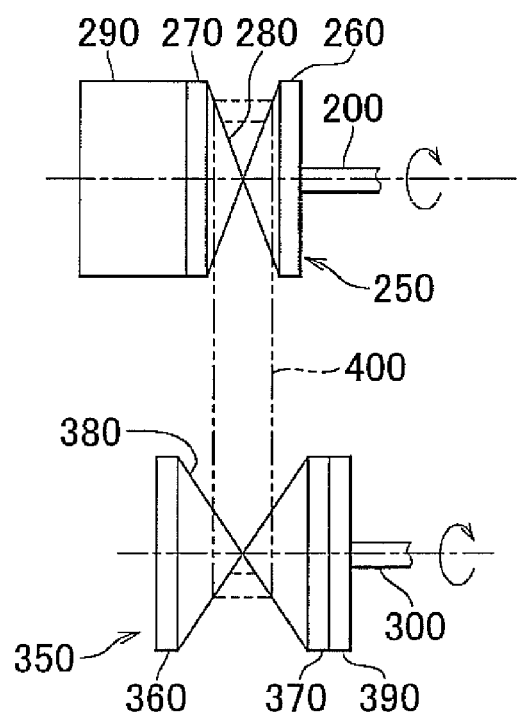
FIG. 3 is a schematic diagram that shows a state with a maximum speed increase ratio of the continuously variable transmission shown in FIG. 1.

FIG. 2 is a schematic diagram that shows a state with a maximum speed reduction ratio of the continuously variable transmission shown in FIG. 1. FIG. 3 is a schematic diagram that shows a state with a maximum speed increase ratio of the continuously variable transmission shown in FIG. 1. The state with a maximum speed reduction ratio, as referred to herein, is a state in which the ratio of the rotation rate of the secondary shaft 300 to the rotation rate of the primary shaft 200 is the lowest in a usual control state in which both driven wheels are rotated by a power inputted from an engine that is a drive power sources. The state with a maximum speed increase ratio, as referred to herein, is a state in which the ratio of the rotation rate of the secondary shaft 300 to the rotation rate of the primary shaft 200 is the highest in the usual control state.

As shown in FIGS. 2 and 3, the width of pulley grooves 280 and 380 is variably controlled following the actuation of hydraulic actuators 290 and 390. As a result, the winding radius (effective engagement radius) of the metal belt 400 on the primary pulley 250 and secondary pulley 350 changes and speed variation is executed. In other words, the primary pulley 250 and secondary pulley 350 are variable-diameter pulleys that can vary the effective engagement radius of the metal belt 400 with the pulley.

As shown in FIG. 2, the rotation rates of the secondary pulley 350 and secondary shaft 300 per unit time decrease the most at the maximum speed reduction ratio. The movable sheave 370 comes closest to the fixed sheave 360 at the maximum speed reduction ratio. As shown in FIG. 3, the rotation rates of the secondary pulley 350 and secondary shaft 300 per unit time increase the most at the maximum speed increase ratio. The movable sheave 270 comes closest to the fixed sheave 260 at the maximum speed increase ratio.

Figure 4:
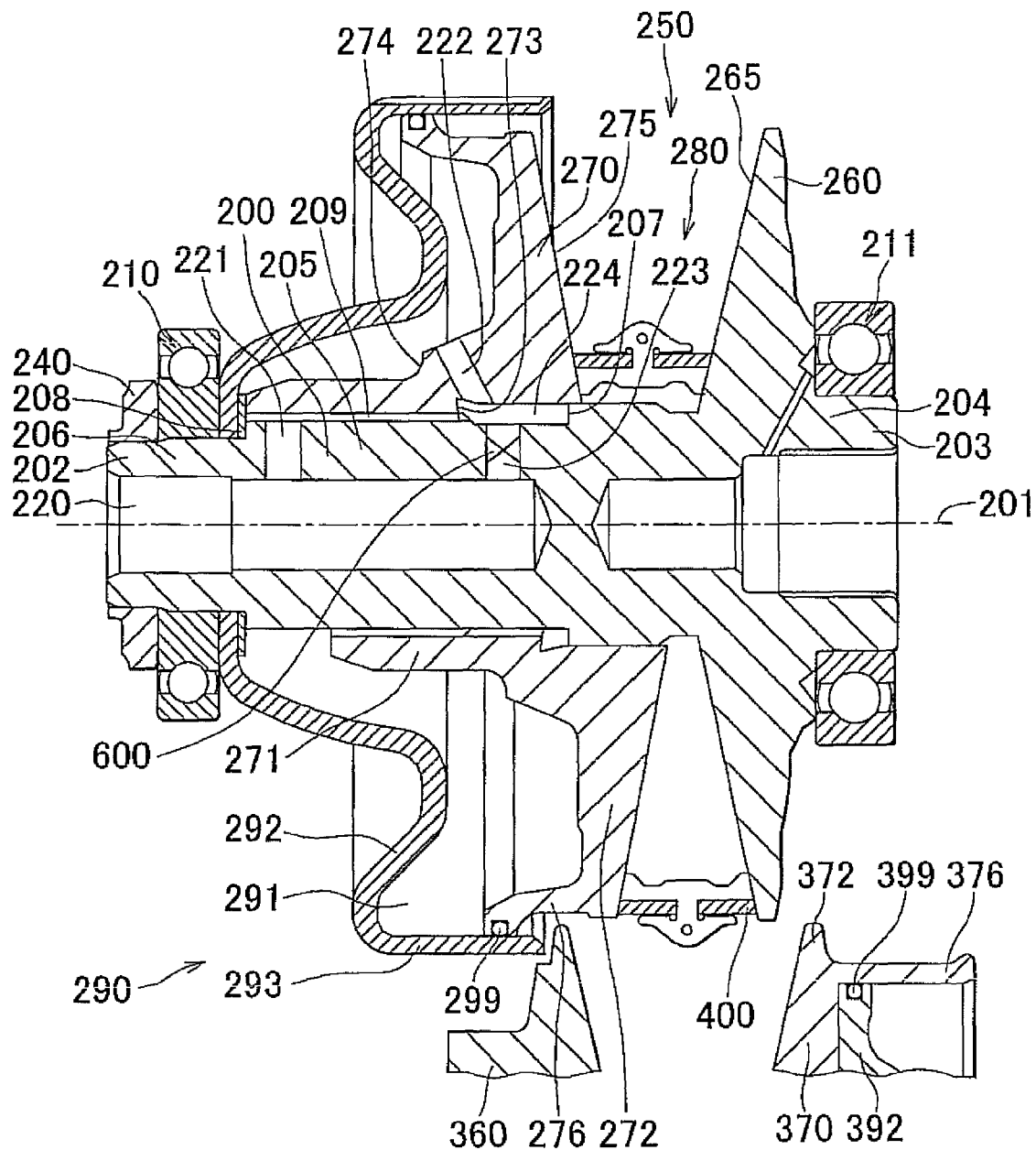
FIG. 4 is a cross-sectional schematic diagram illustrating the primary pulley configuration; here, the vicinity of region IV shown in FIG. 1 is enlarged.

FIG. 4 is a schematic cross-sectional diagram illustrating the primary pulley configuration; here, the vicinity of region IV shown in FIG. 1 is enlarged. In FIG. 4, the primary pulley 250 at the maximum reduction ratio is shown above the virtual central axis 201 of the primary shaft 200, and the primary pulley 250 at a maximum increase ratio is shown below the central axis 201. As shown in FIGS. 1 and 4, one end portion 202 of the primary shaft 200 is rotatably supported on the transaxle rear cover 172 by a bearing 210. The other end portion 203 of the primary shaft 200 is rotatably supported on the transaxle housing 171 by a bearing 211.

The primary shaft 200 has a large-diameter portion 204 that extends from the other end portion 203 to the one end portion 202, a medium-diameter portion 205 that has a diameter smaller that that of the large-diameter portion 204 and is adjacent to the large-diameter portion 204 on the side of the end portion 202, and a small-diameter portion 206 that is formed to have a diameter smaller than that of the medium-diameter portion 205 and adjacent to the medium-diameter portion 205 on the side of the end portion 202. A step portion 207 is formed in the boundary position of the large-diameter portion 204 and medium-diameter portion 205, and a step portion 208 is formed in the boundary position of the medium-diameter portion 205 and small-diameter portion 206.

A plurality of splines (engaging portions) that are formed with a certain spacing in the circumferential direction of the medium-diameter portion 205 and extend in the direction of the central axis 201 are formed at the outer surface of the medium-diameter portion 205, and gaps 209 are formed by the splines. A nut 240 is screwed on the end portion 202 of the primary shaft 200. A bearing 210 is press fitted in a portion of the primary shaft 200 adjacent to the nut 240 on the side of the end portion 203.

An oil passage 220 that extends in the direction of the central axis 201 and oil passages 221 and 223 that extend radially with a certain spacing in the direction of the central axis 201 are formed inside the primary shaft 200. The oil passage 221 links the oil passage 220 with a hydraulic chamber 291 of the below-described hydraulic actuator 290. The oil passage 220 and hydraulic chamber 291 are also linked by an oil path via an oil passage 222 that is formed inside the movable sheave 270, a space 224 of a gap between the movable sheave 270 and the outer circumferential surface of the primary shaft 200, and the oil passage 223.

The fixed sheave 260 is formed in a position of the primary shaft 200 that is adjacent to the bearing 211 on the side of the end portion 202 and is formed integrally with the large-diameter portion 204. The fixed sheave 260 is formed in a disk shape and extends radially and outwardly of the outer circumferential surface of the primary shaft 200.

The fixed sheave 260 includes a disk-shaped collar that protrudes radially and outwardly of the primary shaft 200. Of the surface of the collar of the fixed sheave 260, a portion that faces the movable sheave 270 is the power transmission surface 265 that is in contact with the metal belt 400. The power transmission surface 265 is inclined so as to withdraw from the fixed sheave 270 as the radial distance from the primary shaft 200 increases.

The fixed sheave 270 is provided on the primary shaft 200 at a distance from the fixed sheave 260 in the direction of the virtual central axis 201 of the primary shaft 200 on the side opposite the bearing 211.

The movable sheave 270 includes a cylindrical tubular portion 271 having the primary shaft 200 inserted thereinto and a disk-shaped collar 272 that is formed at the cylindrical portion 271 and protrudes radially and outwardly of the primary shaft 200. A portion of the collar of the movable sheave 270 that faces the fixed sheave 260 is the power transmission surface 275 that is in contact with the metal belt 400. The power transmission surface 275 is inclined so as to withdraw from the fixed sheave 260 as the radial distance from the primary shaft 200 increases.

The collar 272 is formed in a toroidal shape and provided at an end portion on the side of the tubular portion 271 on the side of the fixed sheave 260. The inner diameter of the collar 272 is formed to be larger than the inner diameter of the tubular portion 271. As a result, a step portion 273 is formed in the boundary portion of the inner surface of the collar 272 and the inner surface of the tubular portion 271.

The tubular portion 271 is formed in a cylindrical shape and extends along the direction of the central axis 201. Splines (engaging portions) corresponding to the above-described splines are formed on the inner surface of the tubular portion 271 along the direction of the central axis 201. As a result, the movable sheave 270 is provided so that it can move in the direction of the central axis 201 and cannot move in the circumferential direction of the primary shaft 200.

Of the outer circumferential surface of the movable sheave 270, the outer diameter of the collar 272 on the side of the tubular portion 271 is larger than the outer diameter of the end portion of the tubular portion 271 on the side of the collar 272. As a result, a step portion 274 is formed in the boundary portion of the tubular portion 271 and collar 272 at the outer circumferential surface of the movable sheave 270.

Of the surface of the movable sheave 270, a cylindrical cylinder portion 276 is formed on the side surface that is positioned opposite the power transmission surface 275. This cylinder portion 276 extends along the direction of the central axis 201 and projects to the side of the end portion 202.

The hydraulic actuator 290 is provided with respect to the movable sheave 270 on the side opposite the fixed sheave 260. The hydraulic actuator 290 is provided with a housing portion (hydraulic chamber establishing member) 292 as a first housing portion that acts together with the movable sheave 270 to establish the hydraulic chamber 291 as the first hydraulic chamber. The hydraulic actuator 290 is also provided with an elastic member such as a coil spring (not shown in the figure) that biases the housing portion 292 and the collar 272 of the movable sheave 270 to separate them from each other. The hydraulic chamber 291 is surrounded by the housing portion 292 and movable sheave 270. An end portion of the housing portion 292 on the side of the end portion 202 is latched together with the step portion 208.

The hydraulic actuator 290 causes the movable sheave 270 to move in the axial direction of the primary shaft 200 and brings the movable sheave 270 closer to or moves it farther from the fixed sheave 260 by increasing or decreasing the oil pressure in the hydraulic chamber 291, thereby varying the width of the pulley groove 280.

The oil is supplied to the hydraulic chamber 291 from the oil passage 220 via the oil passages 221 and 223, and the oil pressure inside the hydraulic chamber 291 is raised. The oil discharged from the oil passage 221 passes between the inner circumferential surface of the tubular portion 271 and outer circumferential surface of the medium-diameter portion 205 and reaches the hydraulic chamber 291. As a result, friction between the tubular portion 271 and medium-diameter portion 205 can be reduced, and the movable sheave 270 can move effectively in the direction of the central axis 201.

The housing portion 292 has a sleeve portion 293 of a hollow cylindrical shape that extends in the direction of the central axis 201 of the primary shaft 200. The sleeve portion 293 is formed in a cylindrical shape that shares the central axis 201 with the primary shaft 200. The sleeve portion 293 is formed in a position on the housing portion 292 that is the farthest from the primary shaft 200. The sleeve portion 293 is formed on the radial outer side of the primary shaft 200 with respect to the cylinder portion 276 of the movable sheave 270.

On the inner circumferential side of the sleeve portion 293, the housing portion 292 is located close to and opposite the outer circumferential side of the cylinder portion 276 of the movable sheave 270 via a seal member 299. The seal member 299 is inserted between the movable sheave 270 and housing portion 292. The seal member 299 is an annular seal material, for example such as an O ring, that can be elastically deformed to seal the gap between the movable sheave 270 and housing portion 292. The primary pulley 250 includes the seal member 299 as a first seal member of a seal structure that is inserted between the movable sheave 270 and housing portion 292. Because the seal member 299, which is a hermetic seal material, is inserted, a structure is obtained in which oil located in the hydraulic chamber 291 will not leak from between the movable sheave 270 and housing portion 292.

In a state of a maximum speed increase ratio of the continuously variable transmission 100 that is shown below the central line 201 in FIG. 4, the movable sheave 270 moves in the direction of approaching the fixed sheave 260.

In the secondary pulley 350, the movable sheave 370 is provided at the secondary shaft 300 at a distance from the fixed sheave 360 in the direction of the virtual central axis of the secondary shaft 300. The movable sheave 370 includes a disk-shaped collar 372 protruding radially and outwardly of the secondary shaft 300. A cylindrical cylinder portion 376 is formed on the side surface, of the surface of the movable sheave 370, that is positioned opposite the power transmission surface 375. This cylinder portion 376 extends along the direction of the virtual central axis of the secondary shaft 300 and projects to the side opposite the fixed sheave 360.

The hydraulic actuator 390 is provided with respect to the movable sheave 370 on the side opposite the fixed sheave 360. The hydraulic actuator 390 is provided with a housing portion 392 as a second housing portion that acts together with the movable sheave 370 to establish a second hydraulic chamber. The hydraulic actuator 390 is also provided with an elastic member such as a coil spring (not shown in the figure) that biases the housing portion 392 and the collar 372 of the movable sheave 370 to separate them from each other. The second hydraulic chamber, which is a hydraulic chamber of the hydraulic actuator 390, is surrounded by the housing portion 392 and movable sheave 370.

The hydraulic actuator 390 causes the movable sheave 370 to move in the axial direction of the secondary shaft 300 and brings the movable sheave 370 closer to or moves it farther from the fixed sheave 360 by increasing or decreasing the oil pressure in the second hydraulic chamber, thereby varying the width of the pulley groove 380.

The housing portion 392 is located close to and opposite the cylinder portion 376 of the movable sheave 370 via a seal member 399. The seal member 399 is inserted between the movable sheave 370 and housing portion 392. The seal member 399 may have a fitting structure in which part of an annular seal material is cut to form a gap. The secondary pulley 350 includes the seal member 399 as a second seal member introduced between the movable sheave 370 and housing portion 392.

As described hereinabove, the continuously variable transmission 100 of the present embodiment is provided with a primary pulley 250 provided at the primary shaft 200 and the secondary pulley 350 provided at the secondary shaft 300. The primary pulley 250 includes a fixed sheave 260 fixed to the primary shaft 200, the movable sheave 270 that can move in the axial direction of the primary shaft 200 and rotates together with the primary shaft 200, and a hydraulic actuator 290 that causes the movable sheave 270 to move in the axial direction of the primary shaft 200. The secondary pulley 350 includes the fixed sheave 360 that is fixed to the secondary shaft 300, the movable sheave 370 that can move in the axial direction of the secondary shaft 300 and rotates together with the secondary shaft 300, and the hydraulic actuator 390 that causes the movable sheave 370 to move in the axial direction of the secondary shaft 300.

The hydraulic actuator 290 has the housing portion 292 and the hydraulic chamber 291 that is bounded by the housing portion 292 and movable sheave 270. The hydraulic actuator 290 causes the movable sheave 270 to move in the axial direction of the primary shaft 200 by increasing or decreasing the oil pressure inside the hydraulic chamber 291. The hydraulic actuator 390 has the housing portion 392 and the second hydraulic chamber that is bounded by the housing portion 392 and movable sheave 370. The hydraulic actuator 390 causes the movable sheave 370 to move in the axial direction of the secondary shaft 300 by increasing or decreasing the oil pressure in the second hydraulic chamber.

The primary pulley 250 further includes the seal member 299 having a sealed structure that is inserted between the movable sheave 270 and housing portion 292. The secondary pulley 350 further includes the seal member 399 inserted between the movable sheave 370 and housing portion 392.

A valve 600 is provided in the oil passage 223. The valve 600 acts to prevent the discharge of working oil when the pressure inside the hydraulic chamber 291 is equal to or lower than a predetermined value. For example, a check ball can be used as the valve 600.

The continuously variable transmission according to the present embodiment is provided with the oil passage 222 as a first oil passage provided in the movable sheave 270 serving as a sliding member and the second oil passage 223 that is provided in the primary shaft 200 serving as a shaft supporting the sliding sheave 270 and connected in series to the oil passage 222. The working oil is discharged from the hydraulic chamber 291 via the oil passages 222 and 223. The working oil is more difficult to discharge from the oil passage 223 than from the oil passage 222.

The oil passage 221 serving as a third oil passage is provided in the primary shaft 200. The oil passage 223 is provided on the side close to the metal belt 400, and the oil passage 221 is provided on the side far from the metal belt 400. The oil is more difficult to discharge from the oil passage 223 than from the oil passage 221.

The oil passage 223 and oil passage 221 are connected by the gaps 209, part of the working oil discharged from the oil passage 222 is discharged via the oil passage 223, and the remaining oil is discharged via the oil passage 221.

The valve 600 that is closed by an oil pressure equal to or lower than a predetermined oil pressure is provided in the oil passage 223. The oil passage 221 and oil passage 223 are connected by the gaps 209 present between the movable sheave 270 and primary shaft 200. The primary shaft 200 and movable sheave 270 are fitted together with splines, the gaps 209 are formed between the splines, the power transmission surface 275 inclined with respect to a rotation axis is provided on the movable sheave 270, and the power transmission surface 275 is in contact with the metal belt 400 for power transmission.

In a case where the working oil is introduced in the hydraulic chamber 291, the working oil flows from the oil passage 220 to the oil passage 221 and oil passage 223. The working oil supplied to the oil passage 221 passes through the gaps 209 of splines and is introduced in the hydraulic chamber 291 via the oil passage 222. The working oil supplied to the oil passage 223 is introduced in the hydraulic chamber 291 via the space 224. When a state with a maximum reduction ratio is assumed, the working oil comes out of the hydraulic chamber 291 via a path reversed with respect to the above-described path. The working oil can easily come out of the oil passage 221, but it is difficult for the working oil to come out of the oil passage 223. As a result, an oil pressure is applied to the gaps 209 and splines constituting them. Under the effect of the oil pressure, the movable sheave 270 serving as a sliding member comes into contact in a normal state (perfect position), the movable sheave 270 is prevented from tilting, and a contact surface area of the metal belt 400 and movable sheave 270 can be ensured. Therefore, a belt torque capacity can be ensured. Furthermore, the transmission efficiency can be increased and a delay during restart can be prevented.

Where it is desirable to maintain a predetermined pressure in the hydraulic chamber 291, an opening pressure at which the valve 600 is opened may be taken as the pressure of the hydraulic chamber 291. As a result, where a pressure becomes higher than the opening pressure, the valve 600 is opened. Therefore, no resistance such as hydraulic control during speed change is produced.

Furthermore, in the present embodiment, by providing the valve 600 in the oil passage 223, the discharge of working oil is made more difficult from the oil passage 223 than from the oil passage 222 and also more difficult from the oil passage 223 than from the oil passage 221. However, the invention is not limited to this configuration, and relative difficulty of working oil discharge may be provided by other means. For example, the discharge of working oil may be made difficult by decreasing the cross section area of oil passage, providing an orifice, and the like. Thus, not only the valve 600, but also the narrow oil passage 223 or the passage 223 provided with an orifice may be used to configure a structure in which the working oil is difficult to discharge from the oil passage 223.

All the features of the embodiment disclosed hereinabove are exemplary and should not be considered as limiting. The scope of the invention is represented by the claims, rather than the explanation above, and can be construed to include all the variations equivalent in meaning to the claims and within the scope thereof.

What is claimed is:

1. A continuously variable transmission comprising:
a first oil passage provided in a sliding member; and
a second oil passage provided in a shaft supporting the sliding member and connected in series to the first oil passage, wherein
a working oil is discharged from a hydraulic chamber via the first and second oil passages, and
a valve that is provided in the second oil passage and closes under a pressure equal to or lower than a predetermined pressure,
the working oil is more difficult to discharge from the second oil passage than the first oil passage due to the valve.

2. The continuously variable transmission according to claim 1, wherein
a power transmission surface inclined with respect to a rotation axis is provided on the sliding member, and
the power transmission surface is in contact with a belt for power transmission.

3. A continuously variable transmission comprising:
a first oil passage provided in a sliding member;
a second oil passage provided in a shaft supporting the sliding member and connected to the first oil passage;
a third oil passage provided in the shaft supporting the sliding member and connected to the first oil passage;
a valve that is provided in the second oil passage and closes under a pressure equal to or lower than a predetermined oil pressure,
wherein part of a working oil discharged from the first oil passage is discharged from the second oil passage and the remainder is discharged from the third oil passage, and
the working oil is more difficult to discharge from the second oil passage provided on the side close to a belt for power transmission than from the third oil passage provided on the side far from the belt for power transmission due to the valve.

4. The continuously variable transmission according to claim 3, wherein the second oil passage and the third oil passage are connected by a gap between the sliding member and the shaft.

5. The continuously variable transmission according to claim 4, wherein
the shaft and the sliding member are fitted together with splines, and
the gap is formed between the splines.

6. The continuously variable transmission according to claim 3, wherein
a power transmission surface inclined with respect to a rotation axis is provided on the sliding member, and
the power transmission surface is in contact with a belt for power transmission.

* * * * *